(12) United States Patent
Elbaze et al.

(10) Patent No.: US 7,929,011 B2
(45) Date of Patent: Apr. 19, 2011

(54) METHOD AND SYSTEM FOR HANDLING VIDEO SIGNALS OF CONFERENCE

(75) Inventors: Moshe Elbaze, Tel-Aviv (IL); Sergey Potekhin, Modeine (IL); Knaz Eran, Rishon LeZion (IL); Nir Brachel, Zofit (IL); Eyal Leviav, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 1429 days.

(21) Appl. No.: 11/148,103

(22) Filed: Jun. 8, 2005

(65) Prior Publication Data
US 2006/0023062 A1 Feb. 2, 2006

Related U.S. Application Data

(63) Continuation-in-part of application No. 10/909,446, filed on Aug. 2, 2004.

(51) Int. Cl.
*H04N 7/14* (2006.01)
*H04L 11/00* (2006.01)

(52) U.S. Cl. ............... 348/14.09; 348/14.08; 348/14.11

(58) Field of Classification Search .... 348/14.01–14.16; 370/260–261; 709/204
See application file for complete search history.

(56) References Cited

U.S. PATENT DOCUMENTS

| | | |
|---|---|---|
| 5,440,624 A | 8/1995 | Schoof, II |
| 6,006,253 A | 12/1999 | Kumar et al. ................. 709/204 |
| 6,300,973 B1 | 10/2001 | Feder et al. ................. 348/14.09 |
| 6,496,216 B2 | 12/2002 | Feder et al. ................. 348/14.09 |
| 6,594,269 B1 | 7/2003 | Polcyn |
| 6,760,422 B1 | 7/2004 | Kowal et al. |
| 6,950,119 B2 * | 9/2005 | Kakii et al. ................. 348/14.08 |
| 7,580,375 B1 | 8/2009 | Friedrich et al. |
| 2002/0123895 A1 | 9/2002 | Potekhin et al. .............. 704/275 |
| 2002/0159394 A1 * | 10/2002 | Decker et al. .................. 370/252 |
| 2002/0188731 A1 | 12/2002 | Potekhin et al. .............. 709/227 |
| 2003/0174202 A1 * | 9/2003 | Eshkoli et al. ............. 348/14.08 |
| 2003/0223562 A1 | 12/2003 | Cui et al. |
| 2004/0042553 A1 | 3/2004 | Elbaz et al. ............. 375/240.25 |

OTHER PUBLICATIONS

U.S. Appl. No. 10/909,446, filed Aug. 2, 2004, Potekhin et al.
Office Action dated Aug. 19, 2008 in U.S. Appl. No. 10/909,446.
Response to Office Action dated Aug. 19, 2008 in U.S. Appl. No. 10/909,446.

(Continued)

*Primary Examiner* — Melur Ramakrishnaiah
(74) *Attorney, Agent, or Firm* — Wong, Cabello, Lutsch, Rutherford & Brucculeri LLP

(57) ABSTRACT

A system and method particularly useful in handling the video of a "large" conference is disclosed. The system and method initially defines certain conferees as panel members, which can provide input video signals to the multipoint control unit and can receive output video signals or a composite layout for the conference from the multipoint control unit. The system and method also initially defines audience members, which only passively receive the output video signals or layout from the multipoint control unit and do not have their video signals incorporated into the layout of the videoconference. In one aspect, an audience terminal can request to participate in the conference. By making an appropriate request, if system resources are adequate, participate fully as a panel member and may supply video signals to the conference for at least some portion of time. Alternatively, the audience member can supply information other than video signals to the conference, such as voting data or other data allowing the audience member to participate in the conference as more than a merely passive viewing participant.

42 Claims, 6 Drawing Sheets

OTHER PUBLICATIONS

Final Office Action dated Apr. 1, 2009 in U.S. Appl. No. 10/909,446.
Response to Final Office Action dated Apr. 1, 2009 in U.S. Appl. No. 10/909,446.
Office Action dated Oct. 26, 2009 in U.S. Appl. No. 10/909,446.
Response to Office Action dated Oct. 26, 2009 in U.S. Appl. No. 10/909,446.
Non-Final Office Action for U.S. Appl. No. 10/909,446 mailed Apr. 28, 2010.

* cited by examiner

METHOD AND SYSTEM FOR HANDLING VIDEO SIGNALS OF CONFERENCE

CROSS-REFERENCE TO RELATED APPLICATIONS

This application is a continuation-in-part of co-pending U.S. patent application Ser. No. 10/909,446 filed Aug. 2, 2004, which is incorporated herein by reference in its entirety, and to which priority is claimed.

FIELD OF THE DISCLOSURE

The present invention relates to the field of videoconferences and more particularly to a method and a system for handling media signals (audio, video, data or any combination of those) of a conference.

BACKGROUND OF THE DISCLOSURE

Different methods for handling audio/video of a conference are known in the art. Typically, the same architecture for handling audio/video is used regardless of whether the conference is "small" or "large." A "large" conference may be considered as having ten or more conferees, for example. In a conference, a Multipoint Control Unit (MCU) controls the audio and/or audio/video. The MCU is typically located in a node of a network or in a terminal, such as an "endpoint" associated with a user who participates in the audio or audio/video conference, for example. The MCU receives several channels from access ports, processes audio and visual signals according to certain criteria, and distributes the processed signals to a set of connected channels. An example of an MCU includes the MGC-100, which is available from Polycom Inc. It should be noted that an MCU may also be referred to as an Audio Bridge when only used for an audio conference, and therefore in the present disclosure, the term "MCU" may also be used to represent an Audio Bridge.

When conducting a "large" conference, each conferee is typically connected to a common audio port in the MCU. The audio ports include a decoder, audio signal analyzer (to analyze for example signal energy, DTMF (Dual Tone Multi-Frequency) signaling, voice activation commands, etc.), a mixer, an encoder, and a controller. More information about common audio ports in a multipoint control unit (MCU) can be found in U.S. patent application Publication Nos. US20020123895 and US20020188731, which are both incorporated herein by reference in their entireties.

Conducting a "large" conference requires a large number of audio/video resources, increases the cost of the MCU, and reduces the number of conferences that can be simultaneously controlled by an MCU. Furthermore, a large common interface (a bus, for example) is typically required to carry the open audio/video signals between the different audio/video resources associated with the same conference. In some cases, a larger common interface increases the delay between talking, listening and viewing, because the time interval between two sequential transactions over the bus increases with the size of the bus. In addition, a large number of inputs and outputs modules associated with the same conference place a heavy load on the controller of the conference.

One prior art method for handling the audio and video of a "large" conference delivers an audio port and a video port to each one of the conferees that belongs to a particular group of conferees (a panel, for example). The rest of the conferees (e.g., the audience) receive a multicast or broadcast of the mixed audio/video of the panel. This method reduces the load on the controller and required resources. However, a conferee in the audience is unable to contribute to the conference. For example, the audience member is unable to take any active part in the conference or to change the conferee's current state as an audience member in the conference. In addition, the audience member is unable to speak, to be seen, to vote on a topic being discussed during the conference, etc.

Current techniques for processing the audio/video of a "large" conference are thus not ideal, and a need exists in the art for a system and method for better controlling the audio/video of a "large" conference.

SUMMARY OF THE DISCLOSURE

New systems and methods for handling the audio/video of a "large" conference are disclosed. Statistical observations indicate that most conferences have less than ten conferees, and in the case of "large" conferences having more than ten conferees (e.g. 20, 50 or even up to thousands of conferees), only a group of less than ten conferees are usually active (e.g., speaking or eligible to speak) at any one time. Also, it may be desirable to display the video from only some of the conferees in a layout of the conference because the video signals from most of the conferees would not be useful and would simply take up processing time and layout space. The active group of conferees can be referred to as the panel group. The rest of the conferees can be referred to as the audience group. However, from time to time, a conferee from the audience group will desire to contribute to the conference. Accordingly, the methods and systems of the present disclosure enables conferees of the audience group to contribute while saving conference resources and while reducing the amount of processing.

A system and method particularly useful in handling the video of a "large" conference is disclosed. The system and method initially defines certain conferees as panel members, which can provide video signals to and receive a conference video signal or a layout of video signals for the conference. The system and method also initially defines audience members, which only passively receive a conference video signal or a layout of video signals for the conference and do not have video incorporated into the conference video signal or layout of the videoconference. In one aspect, an audience terminal can request to participate in the conference. By making an appropriate request, the audience terminal can, if system resources are adequate, participate fully as a panel member and may supply video signals to the conference for at least some portion of time. Alternatively, the audience member can supply information other than video signals to the conference, such as voting data or other data allowing the audience member to participate in the conference as more than a merely passive viewing participant.

The foregoing summary is not intended to summarize each potential embodiment or every aspect of the present disclosure, and other features and advantages of the present disclosure will become apparent upon reading the following detailed description of the embodiments with the accompanying drawings and appended claims. Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Embodiments of the invention will be more readily understood from reading the following description and by reference to the accompanying drawings, in which.

DETAILED DESCRIPTION

Figure 1:
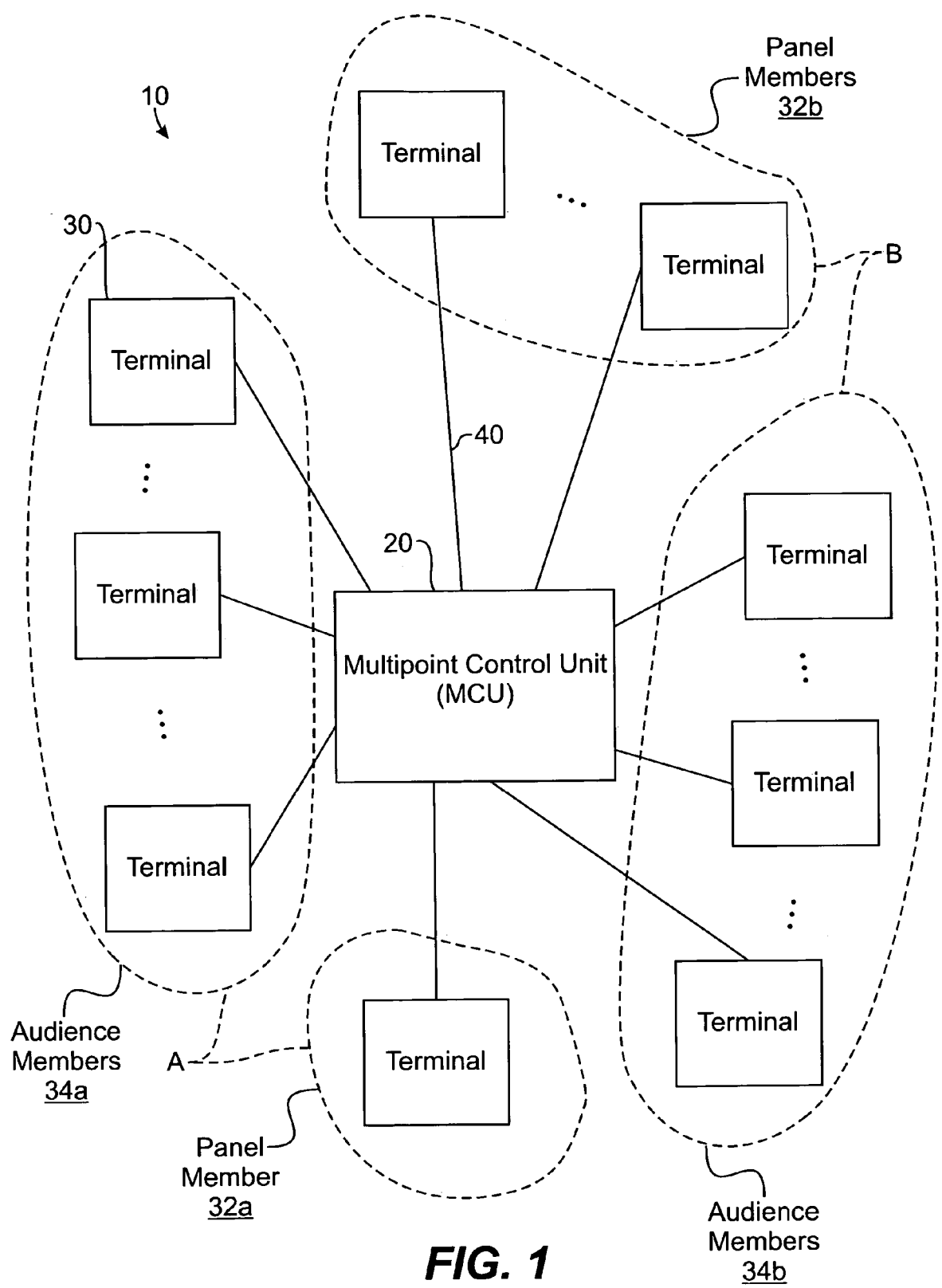
FIG. 1 is a block diagram illustrating an exemplary embodiment of an audio conference system.

An embodiment of a conference system 10 according to certain teachings of the present disclosure is schematically illustrated in FIG. 1. The conference system 10 can be an audio conference or a multimedia (e.g., audio/video/data) conference. The conference system 10 has a plurality of conference endpoints or terminals 30 where conferees are located. The conference terminals 30 are connected over one or more communication networks 40 to a multipoint control unit (MCU) 20. Each conference terminal 30 is capable of providing real-time, two-way audio, audio/video, and/or audio/video/data communication with other conference terminals 30 or with the control unit 20. Exemplary conference terminals 30 can be regular telephones, cellular telephones, IP Phones, video communication endpoints, etc. The communication networks 40 can be packet-based networks, circuit switched networks, and/or other networks or communication protocols, such as ISDN, ATM, PSTN, cellular and/or IP. The disclosed systems and methods are not limited to a particular type of communication protocol or network.

Two large conferences, A and B, are illustrated in FIG. 1. The conferees for each of the conferences, A and B, are defined according to two types, and the type of the conferee can preferably be changed from one type to the other during the conference. A first type of conferee, a "panel" member or conferee 32a&b, can listen and see the audio/video and can speak and be seen during the conference. Thus, the conference terminals 30 for the panel members 32a&b are capable of receiving audio/video signals of the conference and are capable of sending audio/video signals to be transmitted throughout the conference. A second type of conferee, an "audience" member or conferee 34a&b, can listen and see audio/video signals during the conference. In addition, the audience members 34a&b can send one or more electronic signals or data representing requests, commands, or responses to the control unit 20 from their conference terminals 30. The requests, commands, or responses can include a request to speak and be seen during the conference, a vote, a response or message to other members of the conference, or a command to the control unit 20 for performing a function, such as deleting a previous request.

Defining the type of conferee can be done automatically and can be done when reserving the conference, when starting the conference, or when connecting a conferee. When establishing a connection with the terminal 30 of an audience member 34, for example, the control unit 20 temporarily allocates resources (e.g., a temporary audio/video port) to communicate with the conference terminal 30 during the setup of the connection. The temporary resources are typically released after setting the connection. During the setup via the temporary audio port, the audience conferee is informed by the control unit 20 how to generate specific requests. For example, the audience conferee can be informed of which buttons to press on a keypad at the conference terminal 30, what words to say to initiate a request, how to set an out-of-band control channel, or how to connect an additional means to communicate requests.

The requests or signals from the audience terminals can be sent using in-band signals, out-of-band signals, DTMF signals, voice, SMS, or Instant Message, for example. The control unit 20 analyzes and responds to the requests or signals as will be described in detail later. If the request is to speak during the conference, for example, the control unit 20 can allocate an audio port for the requesting terminal 30 and can enable the requester to speak during the conference.

Figure 2:
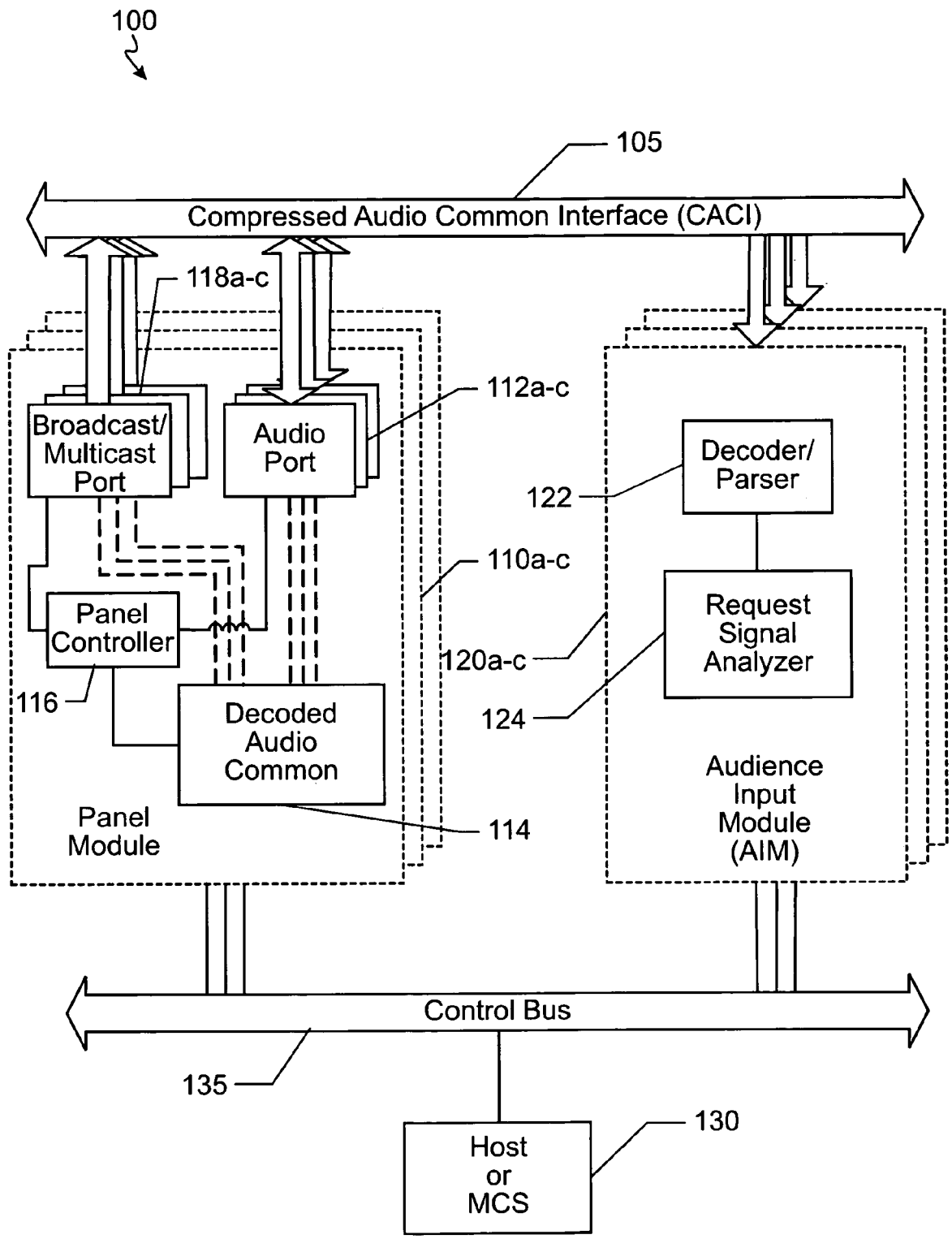
FIG. 2 is a block diagram illustrating an exemplary embodiment of an audio unit within an MCU.

FIG. 2 is a block diagram showing some of the logic elements of an exemplary audio unit 100 within a multipoint control unit (MCU). The audio unit 100, amongst other functions, processes and prepares audio streams for transmission to two or more conference terminals or endpoints (not shown). As noted above, each conference terminal is associated with a conferee participating in the conference. In the present exemplary embodiment, the audio unit 100 includes a compressed audio common interface (CACI) 105, a plurality of panel modules (PMs) 110a-c, a plurality of audience input modules (AIMs) 120a-c, a control bus 135, and a central control unit 130. The central control unit 130 can be a host or a management conference system (MCS).

The panel modules 110a-c are designated for panel members of the conference according to the techniques disclosed herein. As noted above, the panel members of the conference are those members able to speak and listen during the conference. Each panel module 110a-c preferably includes one or more audio ports 112a-c, a Decoded Audio Common Interface (DACI) 114, one or more broadcast/multicast ports (BMP) 118a-c, and a panel controller 116. The DACI 114 enables data to be shared among a plurality of destinations, and can comprise a shared memory, or a bus such as but not limited to a TDM bus, an internal bus of a DSP, a shared memory in a DSP, etc.

The audience input modules 120a-c are designated for audience members of the conference according to the techniques disclosed herein. As noted above, the audience members of the conference are those members able to listen during the conference. Each audience input module 120a-c includes a decoder/parser 122 and a Request Signal Analyzer (RSA) 124.

By way of example only, three units of panel modules 110a-c, audience input modules 120a-c, audio ports 112a-c, and BMPs 118a-c are shown in FIG. 2. It is understood that the disclosed system and method can be used with any number of units. In addition, it is understood that other audio units within an MCU can have different configurations aside form that schematically shown and described herein.

As noted above, a plurality of conference endpoints or terminals (not shown) are connected over one or more communication networks (not shown) to the MCU. The conference terminals send their compressed audio streams to the plurality of panel modules 110a-c and audience input modules 120a-c via Network Interface Modules (not shown) and the CACI 105. In addition, the conference terminals receive compressed audio streams from the appropriate audio ports 112a-c or BMPs 118a-c via the CACI 105 and the Network Interface Modules (not shown).

The CACI 105 transfers the compressed audio streams between the audio ports 112*a-c*, the audience input modules 120*a-c*, BMPs 118*a-c*, and the network interface modules (not shown). The CACI 105 can be a TDM bus, a packet-based bus (such as an ATM bus or IP bus), a serial bus, a parallel bus, a connection switching mechanism, a shared memory, a direct connection, a wireless connection, or any variety of these. The operation of the audio unit 100 is controlled by the central control unit 130 via the control bus 135. The central control unit 130 can be a host computer or an internal module of the MCU. In the present disclosure, the central control unit 130 is referred to as a management conference system (MCS).

Each panel module 110*a-c* and/or audience input module 120*a-c* can be a logic unit, a hardware module, a firmware module, a software module, a DSP, or any combination of these. Moreover, each panel module 110*a-c* and/or audience input module 120*a-c* can be permanent or temporary, which is generated by the MCS 130 according to current needs. Using temporary logic modules and allocating the appropriate modules according to the current needs conserves the resources of the MCU.

The number of panel modules 110*a-c* and/or audience input modules 120*a-c* associated with an audio conference can be a fixed number or can be varied according to the needs of the audio conference. Usually, a "small" audio conference may need only one panel module (e.g., 110*a*) having a plurality of audio ports 112*a-c* with one audio port 112*a-c* for each one of the conference terminals participating in the audio conference. A panel module 110*a-c* for a small conference may not require a BMP 118*a-c*. On the other hand, a "large" audio conference may need one or more panel modules 110*a-c* having a plurality of audio ports 112*a-c* and BMPs 118*a-c*. In such a case, an audio port 112*a-c* can be associated with each of the conference terminals of a panel group, with one BMP 118*a-c* associated with each group of audience conferees that use the same compression protocol or standard. In other exemplary embodiments, the output of one or more of audio ports 112*a-c* can be broadcast or multicast to a group of audience conferees that use the same compression standard. In addition to the panel module 110, a number of audience input modules 120*a-c* may be needed. One audience input module 120 can be associated with each one of the conference terminals of an audience group.

Each audio port 112*a-c* receives compressed audio from its associated conferee via a network interface unit (not shown) and CACI 105. In addition, each audio port 112*a-c* delivers compressed mixed audio to its associated conferee via CACI 105 and the network interface unit. The compressed mixed audio from one or more audio ports 112*a-c* can also be broadcast and/or multicast to a group of audience members using the same compression standard.

In one exemplary embodiment, the audio ports 112*a-c* includes a decoder, an analyzer and enhancer unit, a selector, a mixer, and an encoder. The panel controller 116 receives the results of the analyzer and enhancer unit of each one of the audio ports and controls the operation of the selector and the mixer in each one of the audio ports 112*a-c*.

In another exemplary embodiment, each one of the audio ports 112*a-c* can have a codec, which includes a generic decoder and a generic encoder for decoding/encoding the voice data according to the compression standard that is used by the conference terminal associated with the audio port. The BMP 118*a-c* of such an embodiment can also have an encoder. All other generic logic units that are required for mixing audio (e.g., analyzer and enhancer units, control units, switching and mixing units) can be located in the panel controller 116. The panel controller 116 in such an embodiment can be connected to the DACI 114. The panel controller 116 can then receive the plurality of uncompressed audio streams from the DACI 114, analyze the streams, select and mix the appropriate streams, and deliver the mixed streams back to the DACI 114. The encoder of each one of the audio ports 112*a-c* and/or the BMPs 118*a-c* gets the appropriate mixed uncompressed stream from DACI 114, encodes it, and sends it to the associated one or more conference terminals via the CACI 105.

Various standards may be involved in compression of voice data. For example, the ITU G.729 voice compression standard, which is applicable to video conferencing systems, and the ITU G.723.1 high compression ratio standard may be used. Numerous other standards exist for different systems, including but not limited to, G.711, G.728, etc.

An exemplary BMP 118*a-c* can have, among other elements, a selector, a mixer, and an encoder (not shown). The selector, according to commands from the panel controller 116, gets the appropriate uncompressed audio streams from DACI 114, and delivers them to the mixer. The mixed uncompressed audio from the mixer is transferred to the encoder to be compressed according to the compression standard that is used by the associated group of audience conferees. The compressed mixed audio is broadcast or multicast via the CACI 105 and the appropriate network interfaces (not shown) to the networks (not shown) and from the networks to the associated group of conference terminals (not shown).

In another exemplary embodiment in which the panel controller 116 includes a mixer, the BMP 118 can have an encoder that receives the appropriate uncompressed mixed stream from the DACI 114 based on commands from the panel controller 116. The BMP 118 can then encode the mixed stream according to the appropriate compression standard and transfer the compressed mixed audio to the CACI 105 to be broadcast or multicast to the appropriate conference terminals (not shown).

To improve the operation of a panel module 110*a-c* and reduce any processing delay, the panel module 110*a-c* can be implemented within a hardware chip (a DSP, for example), in which case the DACI 114 can be an internal part of the DSP. For example, DACI 114 can be, but is not limited to, an internal bus of the DSP or the internal memory of the DSP. However, there are embodiments in which one DSP can serve more than one panel module 110*a-c*, or in which one panel module 110*a-c* can be distributed over more than one DSP.

The panel controller 116 receives commands from MCS 130 and sends indications to MCS 130 over control bus 135. Exemplary commands can include adding a certain conferee to the panel, removing one or more conference terminals (i.e., removing compressed audio streams over CACI 105) from the panel group, allocating resources, etc. Exemplary indications that can be sent from the panel controller 116 to the MCS 130 can include indication of the one or more speakers currently in the conference, the duration that each one of the panel members has been active in the conference, indications concerning a certain conferee that has not spoken for a period longer than a certain number of minutes, etc.

More information on the operation of the audio ports 112, the panel controller 116, and the generic logic units (decoders, encoders, analyzer and enhancer units, mixers, etc.) is disclosed in U.S. patent application Publication Nos. US20020123895 and US20020188731, which are both incorporated herein by reference in their entireties.

As noted, each one of the audience input modules 120*a-c* can be associated with a conferee that belongs to an audience group. By way of review, each audience input modules 120a-c includes a decoder/parser 122 and a request signal analyzer 124. In an exemplary embodiment, an audience input module 120a-c receives an appropriate compressed audio stream from an associated conference terminal via CACI 105. The compressed audio stream is decoded by decoder/parser 122 according to the compression standard used by the conference terminal. The decoded stream is transferred to the analyzer 124, which determines whether the decoded signal is a request from the audience conferee. If so, the request is transferred to the MCS 130 via the control bus 135.

In one embodiment, the request can be initiated by pressing a button on a keypad of the conference terminal and transmitting a DTMF signal in-band as an audio signal. In this embodiment, the decoder/parser 122 can be a generic audio decoder, and the analyzer 124 can be a DTMF decoder. The decoded DTMF signals are analyzed, and the one or more symbols that have been pressed by the requesting audience member are transferred to the MCS 130 via the control bus 135. The DTMF symbols can represent a request or command from the associated audience conferee. For example, the DTMF symbols can represent a wish to speak, to vote, to cancel a previous request, etc.

Other exemplary embodiments can use speech recognition methods to transfer requests from an audience conferee to the MCU. In such embodiments, the decoder/parser 122 can be a generic audio decoder, and the analyzer 124 can be a speech recognition module that analyzes the vocal request from the conferee.

In still other alternate embodiments, the request from an audience conferee can be sent over one or more out-of-band channels, such as a control channel instead of through the audio channel. For example, the communication protocol for one embodiment can be Internet Protocol (IP), such as but not limited to H.323 or SIP. In such an embodiment, a control channel between an audience conferee and the MCU can be established according to H.245 standard. As well as carrying the conferee's request, the control channel can be used to carry a report from the MCS 130 concerning events that the requester can select. For example, the report can inform that the requester press a key associated with the number '3' to vote on a particular issue for example, and as will be explained in further detail later.

In one embodiment, an audience input module 120 can be a software module or task that is part of the MCS 130 software, and which is invoked upon receiving a request from an audience conferee. The audience input module task can handle the event using a method, such as disclosed below in conjunction with FIG. 4.

Other exemplary embodiments can use other techniques for sending a request to the MCU over another connection or even over another network aside from links used to carry the audio communication. For example, a requester having a communications device (e.g., a computer, cellular phone, Personal Data Assistant, etc.) can send a request via the Internet as an instant message, an SMS message, etc. In another modification, the MCU and the audience conferees can share a chat room for communicating requests, for example.

Figure 3:
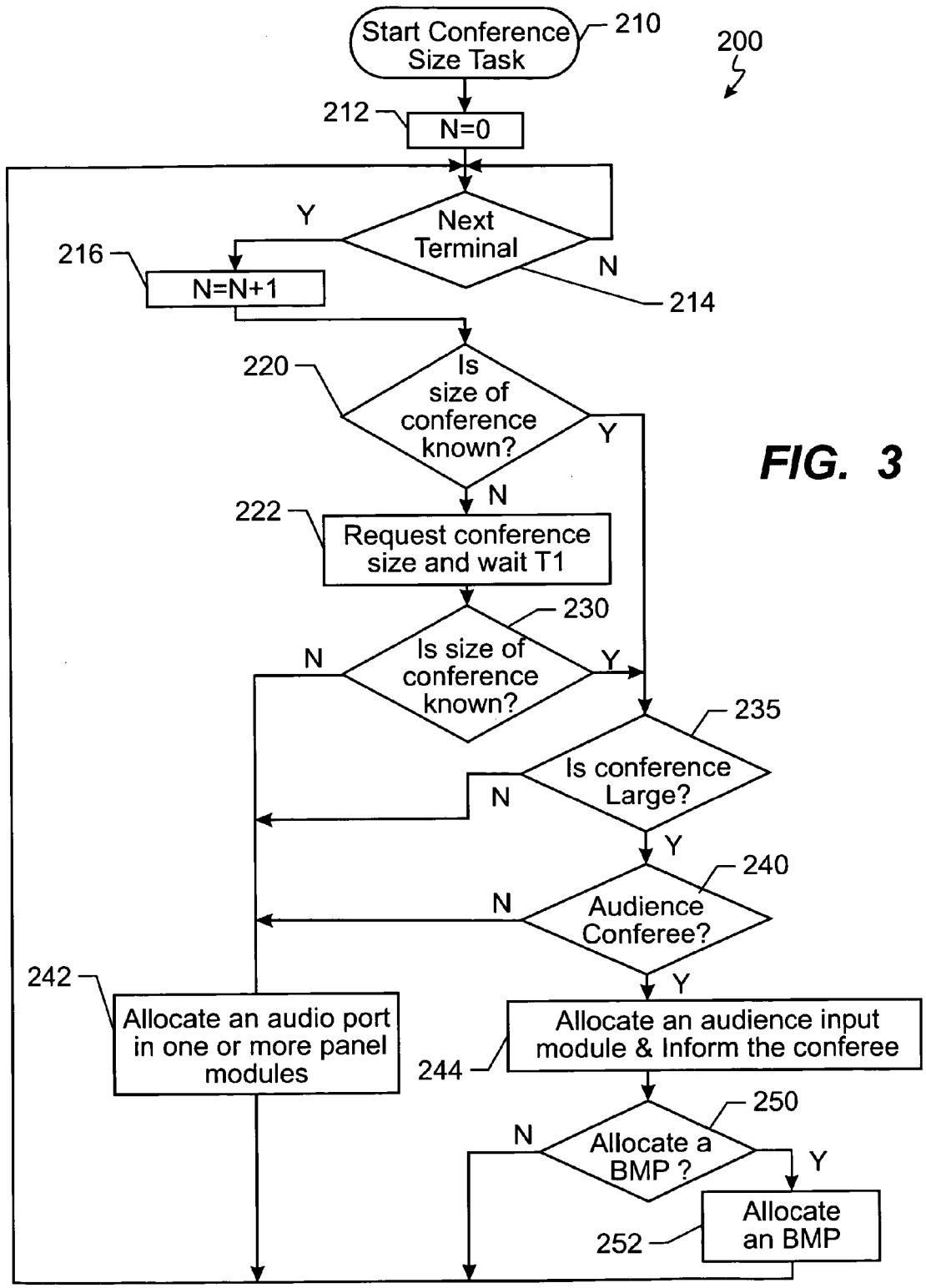
FIG. 3 is a flowchart showing an exemplary method for defining the conference size and for allocating the appropriate audio resources.

FIG. 3 is a flow chart showing steps of an exemplary method 200 for allocating audio resources according to the type of the conference (large or small) and the type of conferee (a panel member or an audience member). Method 200 can be performed by the Management Conference System (MCS) 130 (FIG. 2), and is initiated at step 210 when a new conference is started. After initiation, a counter 'N' is set to zero in step 212, a panel module (110, FIG. 1) is allocated to the conference, and the method 200 waits for a first conference terminal to enter the queue in step 214.

If there is a conference terminal waiting in the queue for resource allocation, then the counter 'N' is increased by one in step 216. In step 220, a decision is then made whether the size of the conference associated with the current session is known. If the size of the conference is unknown at step 220, then a question may be presented to the current conferee. For example, the MCU can use IVR (Interactive Voice Recognition) to ask the current conferee about the type of conference, with a response provided step 222 within a waiting period T1 (e.g., from a few seconds to a few minutes). At the end of the waiting period, a decision is made whether the size of the conference is known at step 230. If not known, the method 200 proceeds to step 242, where an audio port is allocated in one or more panel modules (100a-c, FIG. 2).

If the size of the conference is known at step 230, a decision is made whether the conference is a "large" conference or not at step 235. A "large" conference can be predefined, for example, as a conference having ten or more conferees. In addition, different methods can be used to define the size of the conference and whether it can be consideration "large". For example, the size of the conference can be defined when reserving the conference. Other embodiments can use different dialing numbers or Personal Identification Numbers (PINs) to distinguish a "small" conference from a "large" conference.

Other embodiments can check the value of 'N' and compare it to a predefined value 'N1' (e.g., 8, 10, 15 conferees). If 'N' is greater than 'N1', then the type of the conference is set to "large." If not greater, the conference type is set to "small." Checking the value of conference terminals can be done automatically and can be adapted to current needs. For example, the type of the conference (e.g., "small" or "large") can be automatically changed during the conference, depending on the current number of conferees.

If the conference is "small," then the panel controller (116, FIG. 2) is instructed at step 242 to allocate an audio port (112a-c) to the current conferee. Concurrently, information is also transferred to the panel controller, which includes, but is not limited to, the compression standard used by the conferee, information regarding the CACI (105, FIG. 2) relevant to this conferee, etc. Then, the method 200 returns to the queue at step 214 for the next conferee in the queue.

If the conference type is "large" at step 235, then a decision is made at step 240 whether the current conferee is a panel member or an audience member. This decision can be made by various methods. For example, a different PIN can be "dialed in" by the conferee depending on his status as a panel or audience conferee. Alternatively, IVR can be used to allow the conferee to speak his status. An automatic method can also be used which can define, for example, that any conferee joining the conference after the first N1 conferees is an audience conferee, while the first N1 conferees are panel conferees.

If the current conferee is not an-audience conferee at step 240, then an audio port (112a-c, FIG. 2) is allocated at step 242, and the method 200 proceeds as it is disclosed above for establishing audio resources to a panel conferee. If the current conferee is an audience conferee at step 240, an audience input module (120a-c, FIG. 2) is allocated at step 244 to the current conferee. The audience input module is set according to the parameters of the current conferee, with such parameters depending on the method that is used for transferring requests or signals. For example, if a DTMF signal embedded in the audio signal coming from the conference terminal is to be used, then the parameters can constitute the compression standard used by the conferee's terminal as well as information related to the location of the compressed audio coming from the conference terminal over the CACI (105, FIG. 2).

After allocating the appropriate audience input module, the MCU informs the conferee that he has been connected as an audience conferee. The MCU can also inform the conferee how to create and send requests, signals, or commands to the MCU as noted earlier. For example, the audience conferee can be informed by the MCU that the conferee can contribute to the conference by pressing buttons '5' for speaking, '3' for voting 'YES', '7' for voting 'NO', '1' for removing the previous request or signal, '#' for deleting all previous requests signals, etc.

After allocating the audience input module at step 244, a decision is made at step 250 whether to allocate a broadcast/multicast port (BMP 118*a-c*, FIG. 2). The decision can be based on the compression standard used by the current conferee. If there is already a BMP that handles the conferee's compression standard, then there is no need to allocate additional BMPs, and the method 200 returns to step 214 for the next conferee in the queue.

If the current conferee is the first audience conferee that uses the compression standard, then a BMP is allocated at step 252 to handle that compression standard. The BMP can obtain information on the compression parameters and information on the relevant location over the CACI (105, FIG. 2) associated with the allocated BMP. Then, the method 200 returns to step 214 for the next conferee in the queue.

Figure 4:
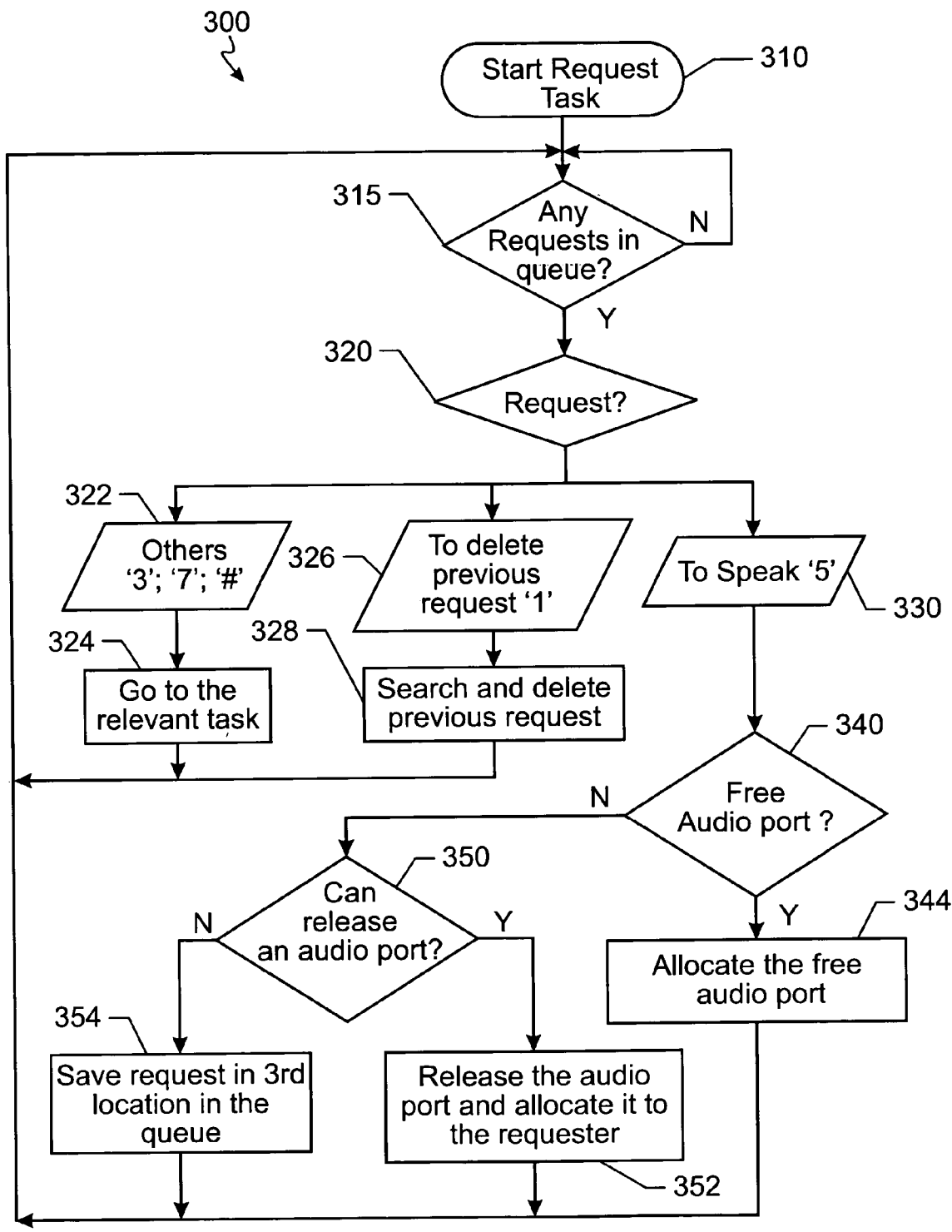
FIG. 4 is a flowchart showing an exemplary method for handling electronic signals or data representing a request or command from an audience conferee during the conference.

FIG. 4 is a flow chart showing steps of an exemplary method 300 for responding to a request, signal, or command coming from an audience conferee. The disclosed method 300 is initiated at step 310 during the start of a new conference. After initiating, the method 300 waits at step 315 for the first conferee request to enter the queue. If there is a request waiting in the queue, then the type of the request is analyzed at step 320. In the present embodiment, the method 300 uses DTMF signals as an exemplary way to carry requests. Other embodiments can use other type of signals to carry the requests as noted earlier.

If the request is to speak at step 330 (e.g., if the received DTMF symbol was '5'), then a decision is made at step 340 whether there is a free audio port (112*a-c*, FIG. 2) that can be allocated to the requester. If there is a free audio port, the free port is allocated at step 344 to the requester, the request is deleted from the queue, and the audience input module (120*a-c*, FIG. 2) assigned to this conferee can be released. Then, the conferee currently connected to that audio port is informed that his status has been changed from an audience conferee to a new panel member and that he can start speaking to the conference. Then, the method 300 returns to step 315 for the next request in the queue.

If there is no free audio port at step 340, then a decision is made at step 350 whether an audio port can be released. Different criteria can be used to make the decision whether to release a certain audio port at step 350. In one example, an audio port that has not been active for a period longer than a certain duration (e.g., 3, 5, 10, etc. minutes) can be released to the requester. Other criteria can reserve a certain number of audio ports for audience conferees (so-called audience audio ports). The audience audio ports can be released when a previous audience conferee terminates his contribution to the conference. Other criteria can release an audience audio port after a certain period of time. For example, audience audio ports can be allocated for only a few minutes and then released automatically. Other exemplary embodiments can use other criteria for releasing an audio port, such as determining whether the conferee has made previous requests and accordingly whether it is fair to grant that conferee access at a particular point in time.

If an audio port can be released at step 350, then the conferee currently connected to that audio port is informed that his status has been changed from a panel member to a new audience conferee at step 352. The new audience conferee is also informed how to create and send requests to the MCU, an audience input module is allocated to the new audience conferee, and the audio port is allocated to the requester.

If an audio port cannot be released at step 350, then the request is removed from the first location in the queue to a lower location at step 354 (e.g., to the third location in the queue) for reconsideration at a later time. Then, the method 300 returns to step 315 for the next request in the queue.

If the request at step 326 is to delete the previous request, signal, or command (e.g., the requester has pressed button '1'), then the previous request is searched in the queue and is deleted at step 328. Then, the method 300 returns to step 315 for the next request in the queue.

If the request, signal, or command is any other type at step 322 (e.g., the requester presses button '3', '7', '#', etc.), then the method 300 invokes an appropriate task for handling the request at step 324. For example, a voting task can be invoked if the requester has pressed buttons '3' or '7'. Then, the method 300 returns to step 315 for the next request in the queue.

Figure 5:
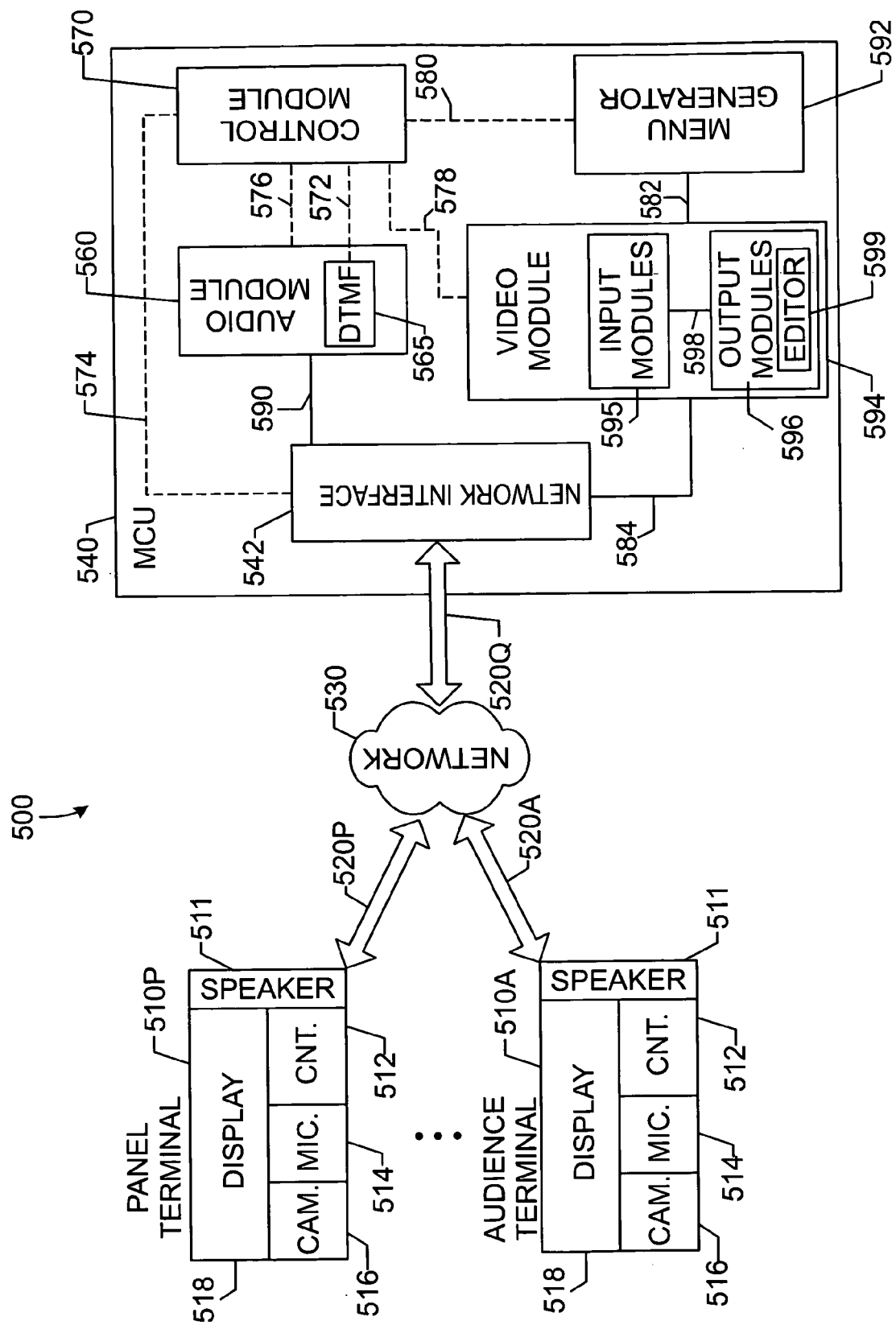
FIG. 5 is a block diagram illustrating an exemplary embodiment of a videoconferencing system.

The previous embodiments of the present disclosure were directed to systems and methods for handling audio signals of a conference. The discussion now turns to embodiments of systems and methods for handling video signals of a conference. FIG. 5 schematically illustrates an embodiment of a videoconferencing system 500 having a plurality of endpoints or terminals 510, multimedia lines 520, a network 530, and a Multipoint Control Unit (MCU) 540. FIG. 5 shows a typical videoconferencing environment in which the MCU 540 can be used. However, alternative embodiments of the system 500 may include other components and/or may not include all of the components shown in FIG. 5. Some components of the videoconferencing system 500 are well known in the art and are only briefly described herein.

Any combination of terminals 510P, 510A can participate in any given videoconference controlled by the MCU 540. In the system 500, at least one of the terminals is designated at the MCU 540 as a panel terminal (e.g., terminal 510P), which is allowed to send video signals to the MCU 540, which process the video signals from the panel terminal. The panel terminal 510P is also allowed to receive output video signals for the conference from the MCU 540. At least one of the terminals is designated at the MCU 540 as an audience terminal (e.g., terminal 510A), which is allowed to receive output video signals from the MCU 540. An audience conferee may send video signals toward the MCU 540: however; the MCU 540 may ignore those signals and will not process them as part of the conference video signal. Therefore, the MCU 540 only processes video signals for the conference from the panel terminals 510P such that the one or more output video signals or composite layouts for the conference produced by the MCU 540 include processed video signals from only the designated panel terminals 510P. In other embodiments, it will be appreciated that the panel terminals 510P can send and receive audio signals in addition to sending and receiving the video signals and that the audience terminal 510A can receive audio signals in addition to receiving the video signals.

In general, the terminals 510P, 510A are configured to provide speech, data, video, or any combination thereof. Accordingly, each terminal 510P, 510A can have a speaker 511, a user control device 512, a microphone 514, a camera 516, a display screen 518, a multimedia line 520, or any combination of these components. Examples of terminals 510 include a regular telephone, an IP Phone, a cellular (with or without a camera), but more commonly would comprise a multimedia terminal like a Polycom View Station, etc. Details of the speaker 511, microphone 514, camera 516, and display 518 of the terminals 510A-N are known in the art.

The control device 512 provides an interface between a user at the terminal 510P, 510A and the MCU 540. Accordingly, the control device 512 can be any number of known devices for the user to send control signals to the MCU 540. For example, the control device 512 can be a dialing keyboard (e.g., the keypad of a telephone) that uses DTMF signals, a dedicated control device that uses other control signals in addition to DTMF signals, or a far-end camera control signaling unit according to standards H.224 and H.281. In addition, the control device 512 can be a conventional keypad having navigation keys or can be software presenting a virtual keypad on the display 518 of the terminal 510P, 510A.

The multimedia lines 520P, 520A convey information between the terminals 510P, 510A and the network 530, and the multimedia line 520Q conveys information between the network 530 and the MCU 540. The information communicated between the terminals 510P, 510A and the MCU 540 includes control signals, audio information, video information, and data.

As the details and functionality of the various components of an MCU are well known in the art, they are not described in exhaustive detail herein. (But see U.S. Pat. No. 6,496,216, U.S. patent application Ser. Nos. 10/144,561, 10/344,792, which are incorporated herein by reference in its entirety.) The MCU 540 includes a network interface 542, an audio module 560, a control module 570, a menu generator 592, and a video module 594. For the embodiments of the present disclosure, such as in FIG. 2, directed to handling audio signals, the audio module or unit (100; FIG. 2) of an MCU included logic elements that were divided into Audience Input Modules (120a-c; FIG. 2) and Panel Modules (110a-c; FIG. 2) for handling the audio for the audience terminals and the panel terminals, respectively. Therefore, in the present embodiment of the MCU 500 in FIG. 5, the audio module 560 can also include such divisions of the logic elements. Furthermore, because the present embodiment of the MCU 500 is directed to handling video signals according to the teachings of the present disclosure, the video module 594 of the MCU 500 also includes divided logic elements. Thus, the video module 594 includes one or more output modules 596 designated for audience terminals 510A, one or more output modules 596 designated for panel terminals 510P, and one or more input modules 595 designated for panel terminals 510P.

The network interface 542 receives the multimedia communication from the terminals 510P, 510A via the network 530 and processes the multimedia communication according to communication standards such as, but not limited to, H.323, H.320, H.321, H.324, and/or Session Initiation Protocol (SIP). (More information concerning communications between terminals and/or MCUs over different networks, and information describing signaling, control, compression, and how to set a video call, for example, can be found in the International Telecommunication Union ("ITU") standards H.320, H.321, H.323, which are incorporated herein by reference in their entireties). The audio module 560 has a DTMF module 565 for detecting and deciphering DTMF tones from the user's terminal 510P, 510A. The video module 594 has video resources, which include video ports (not shown), the input modules 595, the output modules 596, and a common interface 598 between the input and output modules 595, 596. Each of the output modules 596 can have an editor 599.

The panel terminals 510P are allocated a greater amount of video resources or video ports of the MCU 540 than are allocated to the audience terminals 510A. An exemplary video port for a panel terminal (e.g., a panel video port) can be a logical module of the MCU 540 that includes an input module 595 and an output module 596. An alternate video port (e.g., an audience video port) can include an output module 596 of the MCU 540. In one embodiment, each of the audience terminals 510A can be allocated such an audience video portion. In an alternative embodiment of the present disclosure, one audience video port can multicast it's output to a plurality of audience terminals 510A that can receive the same bit rate, compression standard, and resolution. Such an audience video port can behave in a similar way to the BMP (118a-c; FIG. 2) but for processing video and not audio.

The control module 570 essentially controls the operation of the MCU 540, and in particular includes logic modules that process instructions from the DTMF module 565 sent via the control line 572. The control module 570 further includes logic modules that process other dedicated control signals sent via the control line 574. The control module 570 controls the audio module 560 via control line 576, the menu generator 592 via control line 580, and the video module 594 via control line 582.

During operation, the MCU 540 creates output video signals or composite layouts for the videoconference so that the terminals 510P, 510A can receive the output video signals or a unique layout displaying the users at the panel terminals 510P. The MCU 540 generates the conference video signal or layout of the video signals received from the panel terminals 510P based on how many terminals 510P are panel terminals for the videoconference. The conference video signal or layout is then sent to the panel terminals 510P and to the audience terminals 510A of the conference. An example of a conference video signal or layout for a videoconference is discussed below with reference to FIG. 7.

As with embodiments for audio conferences discussed previously in the present disclosure, the MCU 540 is configured to receive a request from the audience terminals 510A. Again, the request from the audience terminal 510A can be a control signal or the like that requests the designation of the sending terminal 510A to be changed from an audience terminal to a panel terminal. Furthermore, the MCU 540 can be configured to receive similar requests from the panel terminals 510P. The requests can be sent by any of the ways discussed previously, such as by an audio in-band signal, a DTMF signal, a voice signal, a signal over an out-of-band channel, etc. In one embodiment, for example, the request is received as a DTMF signal to be processed by the DTMF module 565 in the audio module 560 of the MCU 540.

For a request to change from an audience terminal to a panel terminal, the MCU 540 determines whether the request from the audience terminal 510A can be implemented. For example, the MCU 540 can determine whether video resources of the MCU 540 are available or whether video resources on the MCU 540 can be released. In addition, the MCU 540 can determine whether the current conference layout can accommodate video from an additional panel terminal.

The techniques used by the MCU 540 of the present embodiment for allocating video resources for a videoconference are analogous to the techniques disclosed above with reference to FIG. 3 for allocating audio resources of a conference. Accordingly, techniques similar to those in FIG. 3 are not repeated here for the sake of brevity. However, because the present embodiment involves the allocation of video resources, steps similar to those of Blocks 242 and 244 in FIG. 3 would refer to allocating video resources instead of or in addition to audio resources.

Figure 6:
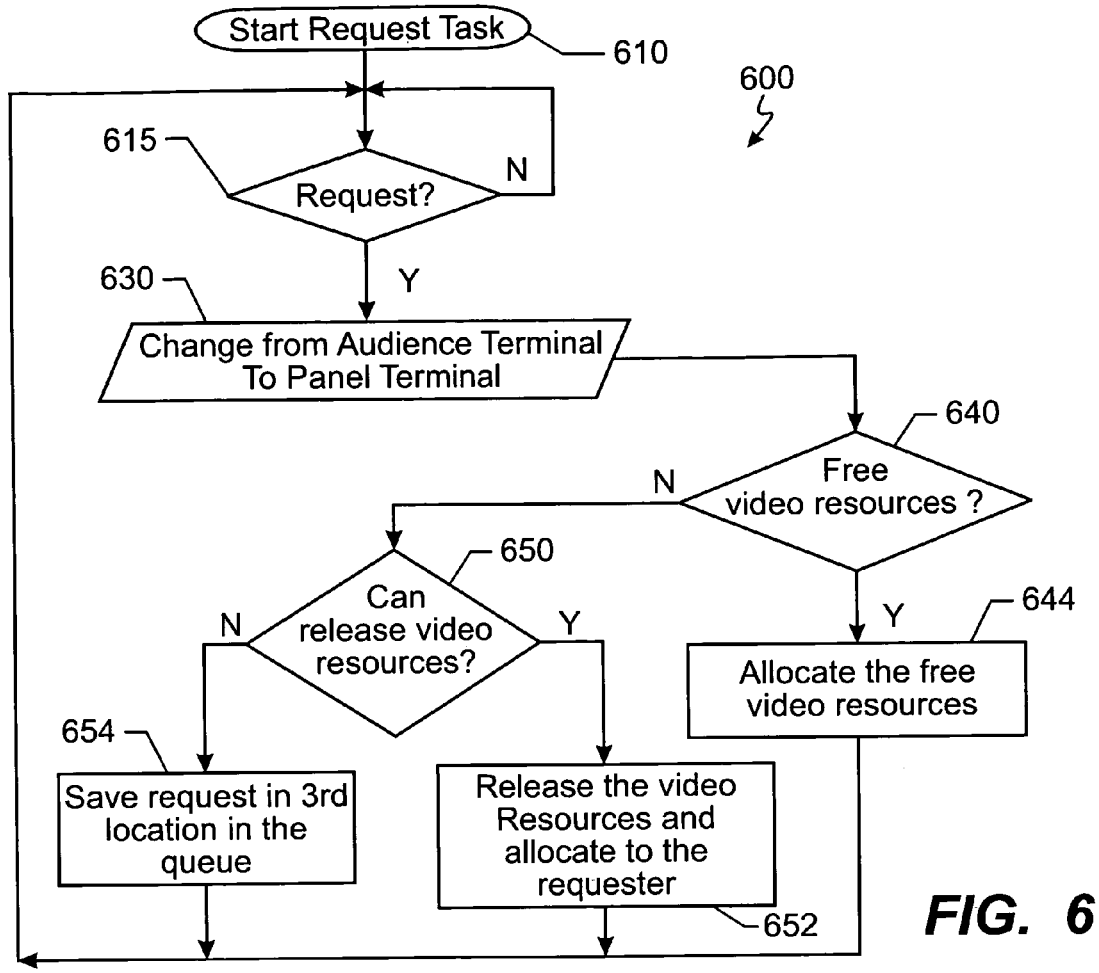
FIG. 6 is a flowchart showing an exemplary method for handling electronic signals or data representing a request or command from an audience conferee during the videoconference.

FIG. 6 illustrates techniques used by the MCU (540; FIG. 5) of the present embodiment for handing requests from terminals during a videoconference. The techniques in FIG. 6 are similar to those disclosed in FIG. 4. Accordingly, most of the techniques in FIG-. 6 are not repeated-here for the sake of brevity. However, because the present embodiment involves the allocation of video resources, steps of Blocks 630, 640, 644, 650, and 652 in FIG. 6 refer to video resources. For example, Block 630 corresponds to a request to change from an audience terminal to a panel terminal (i.e., have the requesting terminals video added to the layout of the videoconference). Of course, such a request can simultaneously or separately request that the requesting terminal's audio also be added to the conference. In addition, Blocks 640 and 644 refer to freeing video resources and allocating the free video resources to a newly added panel terminal. Moreover, Blocks 650 and 652 refer to releasing a video resources and allocating the released video resources to the requesting terminal. As noted above with reference to FIG. 5, the control module (570; FIG. 5) determines and allocates the video resources by controlling the input modules (595; FIG. 5) and the output modules (596; FIG. 5) of the video module (594; FIG. 5) in the MCU (500; FIG. 5).

Figure 7:
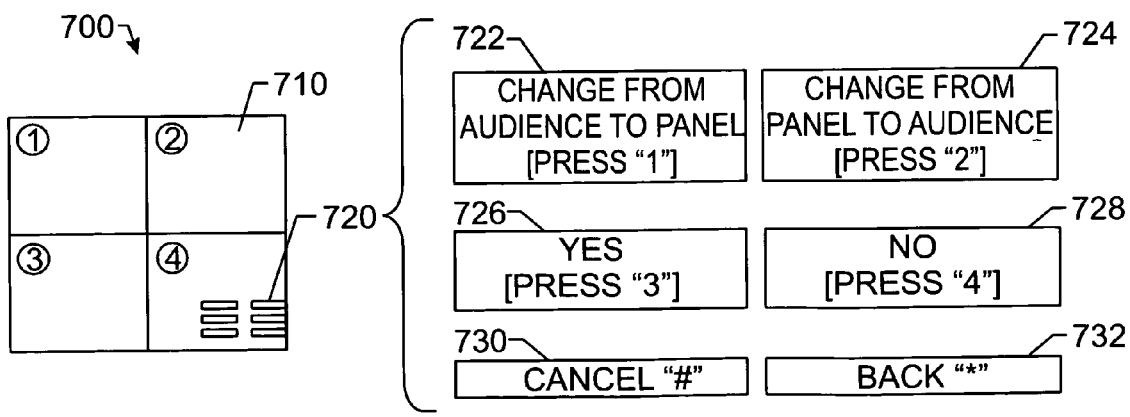
FIG. 7 is an exemplary embodiment of a layout for a videoconference having a menu for generating requests.

FIG. 7 shows an embodiment of a layout 700 for a videoconference according to certain teachings of the present disclosure. The layout 700 has four segments 710, one for each of four (1-4) panel members for the videoconference in the present example. It will be appreciated that a given videoconference may have more or less panel members (e.g., current panel terminals) so that the layout could have more or less segments 710 than shown in FIG. 7. In addition, as the number of panel members changes during the videoconference according to the techniques disclosed herein, the number of segments 710 in the layout 700 can also change. Furthermore, it will be appreciated that the videoconference associated with the layout 700 can have a plurality of audience members capable of viewing the layout 700 at their terminals but their video is not processed by the MCU and is not incorporated into the layout unless expressly requesting to do so.

To generate the layout 700, input streams to the MCU (540; FIG. 5) from each of the panel terminals (510P; FIG. 5) are uncompressed, resized, and scaled to fit a segment 710 in the layout 700 and are composed with an appropriate menu 720, by the relevant editor (599; FIG. 5) into a composite stream. The menu 720 can be generated by menu generator (592; FIG. 5). The composite stream is then encoded or compressed by an encoder into an encoded composite stream according to the compression parameters. Different layouts may be sent to different conferees, and different compression standards may be used for each terminal. Techniques related to mixing various video signals to produce layouts for a videoconference can be found in U.S. Pat. No. 6,300,973; U.S. patent application Ser. Nos. 10/346,306 and 10/344,792, which are incorporated herein in their entireties.

The layout 700 includes a menu 720 for the user at the terminal to make requests and perform other functions. The menu 720 is created with the menu generator (592; FIG. 5), which receives commands from the control module (570; FIG. 5) and generates menu frames with relevant options for selection by the user. The menu 720 can include textual and/or graphical information and can be displayed in addition to, or instead of, part of the common video image of the videoconference, which is typically the video image of the participants. The menu 720 can also include transparent information where the video image of the videoconference can be seen as background through a partially transparent foreground image.

In an embodiment of the present disclosure, the exemplary menu 720 includes a first request 722 for changing the user's terminal from an audience terminal to a panel terminal and a second request 724 for changing the user's terminal from a panel terminal to an audience terminal. The menu 720 also includes selections 726 and 729 (e.g., "Yes" and "No") for voting or making other requests. The requests 722, 724 and selections 726, 728 can be selected by clicking the appropriate key on the terminal's control panel and sending the appropriate DTMF signal. For example, the conferee can press "1" on their terminal to change from an audience terminal to a panel terminal (request 722) or can press "2" to change from a panel terminal to an audience terminal. In addition, the conferee can press "3" to vote "YES" or can press "4" to vote "NO."

In an alternative embodiment, the conferee can move a cursor to the requests 722, 724 and selections 726, 728 and press a key on the terminal to make the request. Moving a cursor may require that the conferee have a dedicated video output module. Therefore, enabling the conferee to move a cursor may be best suited only for panel terminals.

Those skilled in the art will appreciate that the present invention can be implemented in the form of additional software residing in the MCU for performing the methods disclosed herein, additional hardware added to the MCU, or additional software or hardware distributed among the MCU and the conference terminals. Furthermore, those skilled in the art will appreciate that the present invention can be used with any variety of compression standards including, but not limited to G.711, G.728, AMR, and MPEG audio compression, H.261, H.263, H.264, etc of video compression standards. More information on these standard may be found at the website of International Telecommunications Union (ITU), www.itu.int, at www.3GPP.org, or at www.mpeg.org.

In this application, the words "unit," "element," and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of conducting a conference between a plurality of terminals with a conferencing control unit, the method comprising:

designating at the control unit at least one terminal as a panel terminal and at least one terminal as an audience terminal by allocating at least one input video module of the control unit only for the at least one panel terminal and not for the at least one audience terminal;

allocating at least one output video module of the control unit for both the at least one panel terminal and the at least one audience terminal;

processing at the control unit input video signals only from the at least one panel terminal using the at least one input video module only allocated for the at least one panel terminal to form one or more output video signals;

sending the one or more output video signals from the control unit to the at least one panel terminal and to the at least one audience terminal using the at least one output video module; and receiving at the control unit a request from the at least one audience terminal.

2. The method of claim 1, wherein the conference is an audio/video conference or a multimedia conference.

3. The method of claim 1, wherein the one or more output video signals from the control unit include a first output video signal for the at least one panel terminal and a second output video signal for the at least one audience terminal.

4. The method of claim 3, wherein first and second output video signals are the same.

5. The method of claim 3, wherein first and second output video signals are different according to a preference defined by the terminal.

6. The method of claim 1, wherein designating the terminals is performed when reserving the conference, starting the conference, or connecting one of the terminals.

7. The method of claim 1, wherein designating an audience terminal comprises allocating an input module of the control unit for receiving requests from the audience terminal.

8. The method of claim 1, wherein the request comprises a request to change the requesting terminal from an audience terminal to a panel terminal.

9. The method of claim 8, wherein changing the requesting terminal comprises allocating more video resources to the requesting terminal.

10. The method of claim 1, further comprising determining at the control unit whether the request from the audience terminal can be implemented.

11. The method of claim 10, wherein determining whether the request from the audience terminal can be implemented comprises determining whether video resources on the control unit are available.

12. The method of claim 10, wherein determining whether the request from the audience terminal can be implemented comprises determining whether video resources of the control unit can be released.

13. The method of claim 1, wherein the request comprises a request to have input video signals from the requesting terminal to be displayed to the conference.

14. The method of claim 1, further comprising receiving at the control unit a request from the at least one panel terminal to change to an audience terminal.

15. The method of claim 14, wherein changing a panel terminal to an audience terminal comprises reducing a greater amount of video resources of the control unit of the requesting terminal to a lesser amount of video resources of the control unit.

16. The method of claim 1, wherein allocating the audience module of the control unit for the at least one audience terminal comprises allocating an input module of the control unit for receiving requests from the audience terminal.

17. A method of conducting a conference between a plurality of terminals with a conferencing control unit, the method comprising:

allocating at least one input video resource and at least one output video resource of the control unit;

initially designating at the control unit at least one terminal as a panel terminal by allocating a panel module of the control unit for the at least one panel terminal, the panel module associated with both the at least one input video resource and the at least one output video resource, wherein the panel terminal transmits an input video signal for the conference to the at least one input video resource of the control unit and receives a first output video signal from the output video resource of the control unit;

initially designating at the control unit at least one terminal as an audience terminal by allocating an audience module of the control unit for the at least one audience terminal, the audience module associated with the at least one output video resource and not associated with any of the at least one input video resources, wherein the audience terminal receives a second output video signal from the at least one output video resource of the control unit, wherein the first and second output video signals include the input video signals transmitted only from the at least one panel terminal to the input video resource; and receiving at the audience module of the control unit a request from the at least one audience terminal.

18. The method of claim 17, wherein the conference is an audio/video conference or a multimedia conference.

19. The method of claim 17, wherein the first and second output video signals are the same.

20. The method of claim 17, wherein the first and second output video signals are different according to a preference defined by the terminals.

21. The method of claim 17, wherein designating the terminals is performed when reserving the conference, starting the conference, or connecting one of the terminals.

22. The method of claim 17, wherein the request comprises a request to change the requesting terminal from an audience terminal to a panel terminal.

23. The method of claim 22, wherein changing the requesting terminal comprises allocating more video resources to the requesting terminal.

24. The method of claim 17, further comprising if the request can be implemented by the control unit, thereafter receiving information from the requesting audience terminal.

25. The method of claim 24, wherein the request comprises a request to have input video signals from the audience terminal to be displayed to the conference, and wherein the information comprises the input video signal from the requesting terminal.

26. The method of claim 17, further comprising receiving at the control unit a request from the at least one panel terminal to change to an audience terminal.

27. The method of claim 26, wherein changing a panel terminal to an audience terminal comprises reducing a greater amount of video resources of the control unit of the requesting terminal to a lesser amount of video resources of the control unit.

28. A system for conducting a conference over a network and between a plurality of terminals, the system comprising:

a control unit in communication with the terminals via the network, each terminal being designatable by the control unit as a panel terminal or an audience terminal, wherein the control unit comprises:

one or more input video modules allocated only to the panel terminals and not to the audience terminals for receiving input video signals only from the panel terminals, and one or more output video modules allocated to the panel and audience terminals for sending one or more layouts of the conference to the terminals, the control unit processing input video signals with the one or more input video modules only from the panel terminals to form one or more output video signals and sending the one or more output video signals with the one or more output video modules to the panel terminals and to the audience terminals, wherein the control unit receives and responds to electronic signals from the audience terminals.

29. The system of claim 28, wherein the conference is an audio/video conference or a multimedia conference.

30. The system of claim 28, wherein the electronic signal comprises a request from the audience terminal.

31. The system of claim 30, wherein the control unit changes the designation of an audience terminal to a panel terminal in response to the request.

32. The system of claim 30, wherein the control unit allocates more video resources to the requesting terminal.

33. The system of claim 30, wherein the control unit determines whether video resources of the control unit are available for the requesting terminal.

34. The system of claim 30, wherein the control unit releases video resources of an inactive panel terminal and allocates the released video resources to the requesting terminal.

35. A control unit for conducting a conference between a plurality of terminals, the control unit comprising:

one or more input video resources allocated for receiving input video signals;

one or more output video resources allocated for sending one or more layouts of a conference;

at least one panel module allocated for one or more panel terminals of the plurality of terminals, the panel module associated with both the one or more input video resources and the one or more output video resources, the panel module processing input video signals only from the panel terminals using the one or more input video resources to be displayed in the one or more layouts for the conference, the panel terminal sending the one or more layouts of the conference to the plurality of terminals using the one or more output video resources; and at least one audience module allocated for one or more audience terminals of the plurality of terminals, the audience module associated with the one or more output video resources and not associated with any of the one or more input video resources, the audience module receiving an audience signal from the audience terminals.

36. The control unit of claim 35, wherein the audience module comprises one or more input modules allocated to the audience terminals for receiving the audience signal from the audience terminals.

37. The control unit of claim 35, wherein the modules are permanent or temporary logic modules.

38. The control unit of claim 35, wherein the audience signal comprises a request for the control unit to designate the sending audience terminal as a panel terminal.

39. The control unit of claim 38, wherein the control unit determines whether the panel module has free video resources for the requesting terminal.

40. The control unit of claim 39, wherein the control unit allocates the free video resources of the panel module to the requesting terminal.

41. The control unit of claim 39, wherein the control unit releases video resources of an inactive panel terminal and allocates the released video resources to the requesting terminal.

42. The control unit of claim 41, wherein the control unit designates the inactive terminal as an audience terminal.

* * * * *

UNITED STATES PATENT AND TRADEMARK OFFICE
CERTIFICATE OF CORRECTION

| | | |
|---|---|---|
| PATENT NO. | : 7,929,011 B2 | Page 1 of 1 |
| APPLICATION NO. | : 11/148103 | |
| DATED | : February 1, 2011 | |
| INVENTOR(S) | : Moshe Elbaz et al. | |

It is certified that error appears in the above-identified patent and that said Letters Patent is hereby corrected as shown below:

Title page, item [75]
Inventors: Moshe Elbaze and Knaz Eran

Should be as follows:
        Moshe Elbaz and Eran Knaz

Signed and Sealed this
Thirty-first Day of May, 2011

David J. Kappos
*Director of the United States Patent and Trademark Office*